(12) United States Patent
Maronati et al.

(10) Patent No.: US 10,024,377 B2
(45) Date of Patent: Jul. 17, 2018

(54) VENTILATED BRAKE DISC

(71) Applicant: FRENI BREMBO S.p.A., Curno (IT)

(72) Inventors: Gianluigi Maronati, Curno (IT); Leone Oberti, Curno (IT); Nino Ronchi, Curno (IT)

(73) Assignee: Freni Brembo S.P.A. (IT)

( * ) Notice: Subject to any disclaimer, the term of this patent is extended or adjusted under 35 U.S.C. 154(b) by 0 days.

(21) Appl. No.: 15/106,173

(22) PCT Filed: Dec. 16, 2014

(86) PCT No.: PCT/IB2014/066950
§ 371 (c)(1),
(2) Date: Jun. 17, 2016

(87) PCT Pub. No.: WO2015/092671
PCT Pub. Date: Jun. 25, 2015

(65) Prior Publication Data
US 2017/0002879 A1    Jan. 5, 2017

(30) Foreign Application Priority Data
Dec. 19, 2013 (IT) .............................. MI2013A2137

(51) Int. Cl.
*F16D 65/12* (2006.01)
*F16D 65/02* (2006.01)

(52) U.S. Cl.
CPC ...... *F16D 65/128* (2013.01); *F16D 2065/132* (2013.01); *F16D 2065/1328* (2013.01)

(58) Field of Classification Search
CPC .......... F16D 65/128; F16D 2065/1328; F16D 2065/788; F16D 2065/1308
See application file for complete search history.

(56) References Cited

U.S. PATENT DOCUMENTS 4,083,435 A  *  4/1978 Gallus .................. F16D 65/123
                                                              188/218 XL
4,865,167 A     9/1989 Giorgetti et al.
(Continued)

FOREIGN PATENT DOCUMENTS

DE    1164455          3/1964
DE    4323782 A1       1/1994
(Continued)

OTHER PUBLICATIONS

Italian International Search Report dated Mar. 25, 2015 in corresponding PCT Patent Application No. PCT/IB2014/066950.
(Continued)

*Primary Examiner* — Anna M Momper
(74) *Attorney, Agent, or Firm* — Waller Lansden Dortch & Davis, LLP; Matthew C. Cox

(57) ABSTRACT

A ventilated brake disc is provided which comprises a braking band defined by two plates co-axial with facing surfaces from which connection elements are axially extended. Each connection element has two respective ends at which the element is joined to the plates. Several of the connection elements are associated to elongate crests which extend from their ends in one or more given directions. The elongate crests are integrally formed with the connection elements and plates, and are raised from the facing surfaces of the plates.

17 Claims, 4 Drawing Sheets

(56) References Cited

U.S. PATENT DOCUMENTS

| | | |
|---|---|---|
| 4,982,127 A | 1/1991 | Marandet |
| 5,161,652 A | 11/1992 | Suzuki |
| 5,427,212 A | 6/1995 | Shimazu et al. |
| 5,526,905 A | 6/1996 | Shimazu et al. |
| 5,542,503 A | 8/1996 | Dunn et al. |
| 6,152,270 A | 11/2000 | Giorgetti |
| 6,241,053 B1* | 6/2001 | Tahara .............. F16D 65/12 188/218 XL |
| 6,367,599 B2 | 4/2002 | Kobayashi |
| 7,066,306 B2 | 6/2006 | Gavin |
| 7,267,210 B2 | 9/2007 | Cornolti et al. |
| 7,849,980 B2 | 12/2010 | Kawai et al. |
| 8,037,980 B2 | 10/2011 | Pahle |
| 2004/0084262 A1 | 5/2004 | Baylis et al. |
| 2004/0124047 A1 | 7/2004 | Oberti et al. |
| 2004/0178030 A1 | 9/2004 | Pacchiana et al. |
| 2004/0182660 A1 | 9/2004 | Cavagna et al. |
| 2004/0188196 A1 | 9/2004 | Gavin |
| 2006/0243546 A1 | 11/2006 | Oberti et al. |
| 2007/0246314 A1 | 10/2007 | Schorn et al. |
| 2010/0230221 A1* | 9/2010 | Biondo .............. F16D 65/12 188/218 XL |
| 2011/0108378 A1* | 5/2011 | Leone .............. F16D 65/128 188/218 XL |
| 2012/0255821 A1* | 10/2012 | Cavagna .............. F16D 65/128 188/218 XL |

FOREIGN PATENT DOCUMENTS

| | | |
|---|---|---|
| DE | 29823373 U1 | 5/1999 |
| DE | 19843399 A1 | 3/2000 |
| DE | 10358088 A1 | 7/2005 |
| EP | 2325517 A1 | 5/2011 |
| EP | 2469117 A1 | 6/2012 |
| FR | 2878593 A1 | 6/2006 |
| JP | 04056933 | 5/1992 |
| WO | 02064992 A2 | 8/2002 |
| WO | 02073060 A1 | 9/2002 |
| WO | 2004102028 A1 | 11/2004 |
| WO | 2004102029 A1 | 11/2004 |
| WO | 2006046258 A1 | 5/2006 |
| WO | 2008135876 A2 | 11/2008 |
| WO | 2008136032 A2 | 11/2008 |
| WO | 2012164465 A1 | 12/2012 |

OTHER PUBLICATIONS

International Search Report for PCT/IT2008/000304, dated Feb. 5, 2009, eight pages.

* cited by examiner

|  | DISC I | DISC II | Δ% | DISC III | Δ% |
|---|---|---|---|---|---|
| MASS [kg] | 9,3 | 8,3 | -10,8 | 8,3 | -10,8 |
| VENTILATION CHAMBER [mm] | 10 | 14 | +40 | 14 | +40 |
| REMOVED POWER [W] | 1616,2 | 1801,6 | +11,5 | 1995,1 | +23,4 |
| CONVECTIVE HEAT TRANSFER COEFFICIENT [W/mm²K] | 6,838525 e⁻⁵ | 7,008750 e⁻⁵ | +2,5 | 7,503221 e⁻⁵ | +9,7 |
| TRANSFER SURFACE [mm²] | 118171,5 | 128525,2 | +8,8 | 132947,7 | +12,5 |
| MASS FLOW [kg/s] | 1,104028 e⁻³ | 1,360042 e⁻³ | +23,2 | 1,350321 e⁻³ | +22,3 |

VENTILATED BRAKE DISC

This application is a National Phase Application of PCT International Application No. PCT/IB2014/066950, International Filing Date, Dec. 16, 2014, claiming priority to Italian Patent Application No. MI2013A002137 (102013902218917), filed Dec. 19, 2013, each of which is hereby incorporated by reference in its entirety.

FIELD OF THE INVENTION

The present invention relates to a ventilated brake disc for motor vehicles, particularly, though not exclusively, for cars and commercial vehicles.

BACKGROUND OF THE INVENTION

Brake discs are known comprising a bell, an annular portion called braking band extending therefrom, which is intended to co-operate with the pads of a caliper. In ventilated discs, the braking band is made of a couple of mutually facing plates which are connected to each other by a plurality of connection elements, typically in the form of pins or tabs. The outer surfaces of the two plates define opposite braking surfaces. The inner facing surfaces define, in conjunction with the pins or tabs, ventilation ducts for cooling the disc for the air to flow therein in a centrifugal direction during the rotation movement of the disc.

In order to improve the ventilation and reduce cracks resulting from temperature changes, ventilated brake discs have been proposed having shaped connection elements in order to enhance the effectiveness of the ventilation ducts.

WO 2008/136032 A2, in the name of the Applicant, discloses ventilated brake discs comprising joining elements in the form of tabs distributed in two concentrical arrays; the tabs are elongated in substantially radial directions with a concavity facing the preferred direction of rotation of the disc.

A ventilated brake disc in WO 2008/136032 A2 provides connection elements in the form of pins distributed in three concentric arrays, where the radially outermost array comprises pins with a drop-shaped cross-section, a radially innermost array with radially elongate pins, and a radially intermediate array with pins having a rhombus cross-section, with rounded vertexes and the main diagonal orientated in substantially radial directions.

WO 2012/164465 A1 discloses a ventilated brake disc with connection elements in the form of pins distributed in three concentric arrays, where the pins of the radially intermediate radially intermediate array have a shaped cross-section such as a star with four rounded points. Between the pins of the radially outermost array, axially aligned projections are placed projecting from the two facing inner surfaces of the two plates of the braking band.

SUMMARY OF THE INVENTION

It is an object of the present invention to extend the operating life of a ventilated brake disc. A particular object of the invention is either to reduce or eliminate the occurrence of thermal cracks as much as possible. Specifically, the ventilation in a brake disc of the ventilated type is desired to be optimized and improved by reducing the operating temperature thereof, without affecting the mechanical characteristics thereof.

According to an aspect of the present invention, the above-mentioned objects are achieved by increasing the heat transfer surface of the brake disc and consequently the thermal power which is exchanged in a ventilated brake disc of the type defined in the preamble of claim 1. In summary, at least several of said plate connection elements are associated with elongate crests extending from the ends of the connection elements according to one or more given directions. These elongate crests are integrally formed with the connection elements and plates, and are raised from the facing surfaces of the two plates. Preferred and, advantageous characteristics are defined in the dependent claims.

BRIEF DESCRIPTION OF THE DRAWINGS

Several embodiments of a brake disc according to the invention are described below by means of exemplary embodiments, which are given only as non-limiting examples. Reference is made to the annexed drawings, in which.

DETAILED DESCRIPTION

Figure 1:
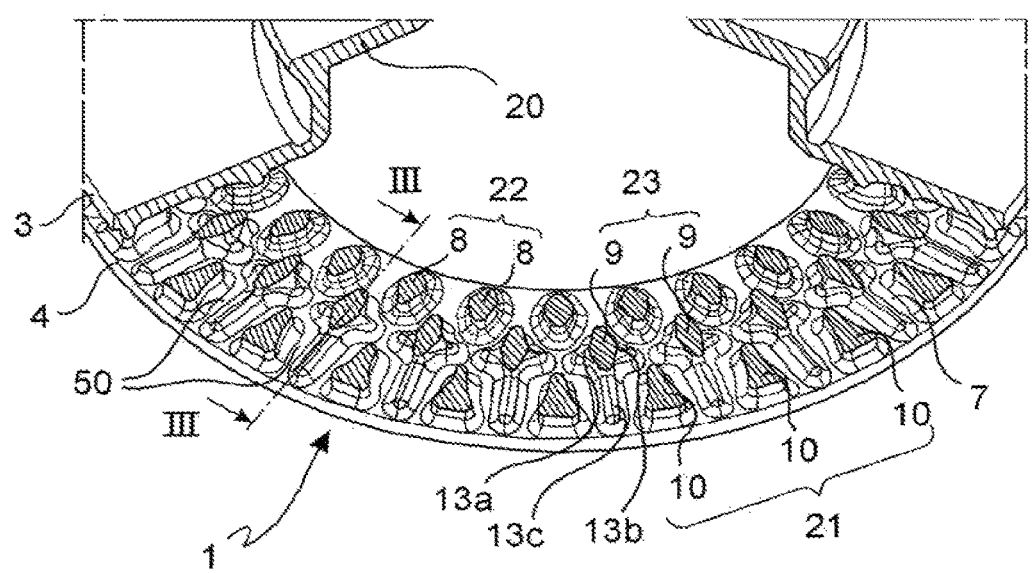
FIG. 1 is a perspective view of a ventilated brake disc with the bell-side plate being partially cut away.

With reference to the drawings, a ventilated brake disc according to the invention, intended to be mounted to a motor vehicle, for example a car, is generally designated at 1. The disc 1 has a substantially circular configuration and is developed around an axis, which is designated at Z in the figures.

Within this context, the expression "axial direction" indicates a direction parallel to the axis Z. "Radial" indicates a direction perpendicular to the axial direction or axis Z. "Tangential or circumferential" to the disc indicates a direction according to a circumference having its centre on the Z axis.

The disc 1 comprises a support bell 20 and a braking band 2 co-axial to the bell 20. The braking band 2, which is intended to co-operate with a brake caliper (not illustrated) to exert a braking action on the vehicle, is defined by two plates 3, 4 co-axial to the axis Z. A first plate 3 is arranged on the side of the support bell 20, whereas the second plate 4 is arranged on the opposite side. The two plates are mutually facing and axially spaced, so as to form a gap 5.

The two plates 3, 4 have facing surfaces 6, 7, from which connection elements 8, 9, 10 are transversally or axially extended between the plates. The facing surfaces 6, 7 define, in conjunction with the connection elements 8, 9, 10 within the gap 5, disc-cooling ventilation ducts 50 for the air to flow therein in centrifugal directions during the rotation of the disc. The connection elements are made of the same material as the plates 3, 4 and are preferably made as one piece (particularly, by fusion) with the plates.

In the embodiment illustrated in the annexed figures, the connection elements 8, 9, 10 between the plates 3, 4 are pillar-like or pin-like elements. Advantageously, the connection elements 8, 9, 10 are evenly distributed along the facing surfaces 6, 7 of the two plates 3, 4.

The connection elements are arranged along at least two concentric circular arrays, comprising an outer array 21, i.e. farther from the axis Z, and an inner array 22, i.e. closer to the axis Z.

In accordance with the embodiments described herein, the connection elements 8, 9 and 10 are arranged on three concentric circular arrays, corresponding to an outer array 21, an intermediate array 23 and an inner array 22.

Preferably, each element 10 of the outermost array 21 is radially aligned with a corresponding element 8 of the innermost array 22, whereas the elements 9 of the intermediate array 23 are circumferentially staggered relative to inner 8 and outer 10 connection elements.

In order to facilitate the passage of the centrifugal airflows, the connection elements 8, 9, 10 preferably have a cross-section or axial section of a radially elongated shape in an axial plane.

According to a variant embodiment, not illustrated, the connection elements between the two plates can comprise tabs elongated in substantially radial directions.

Each connection element 8, 9, 10 has two respective ends 11, 12 or base portions, where the same connection element is joined to the plates 3, 4.

A plurality of connection elements, in this example the connection elements 9, are associated with elongate crests 13 extending from the base portions thereof in at least one given direction. The elongate crests 13 are integrally formed with the connection elements 9 and plates 3, 4, and are raised from the facing surfaces 6, 7 of the two plates.

Each elongate crest emerges from the respective surface 6 or 7 by a shorter height than the axial distance between the two facing surfaces 6, 7.

In an embodiment, at least several of the elongate crests emerge from the respective surface 6 or 7 by a height less than half the distance between the surfaces 6 and 7.

Preferably, the elongate crests 13 are made of the same material as the plates 3, 4 and connection elements 8, 9, 10 and are preferably made as one piece (particularly, by fusion) with the plates and connection elements.

Figure 2:
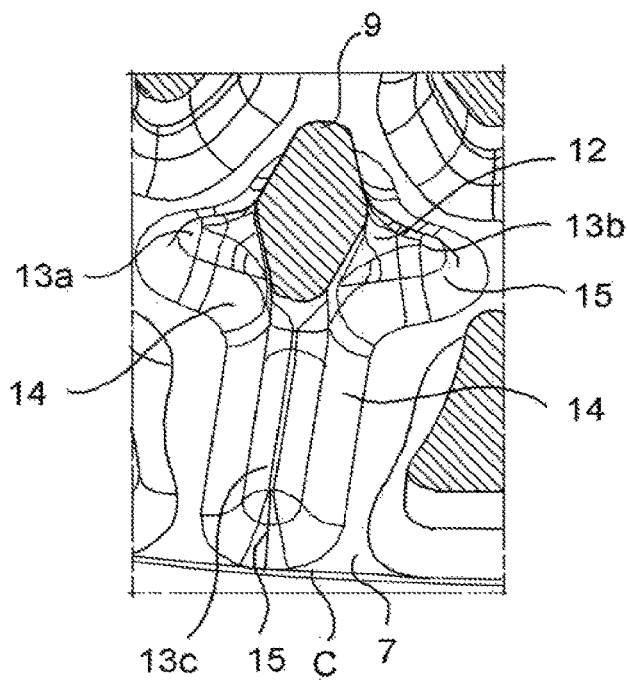
FIG. 2 is an enlarged perspective view of a detail in FIG. 1.
Figure 3:
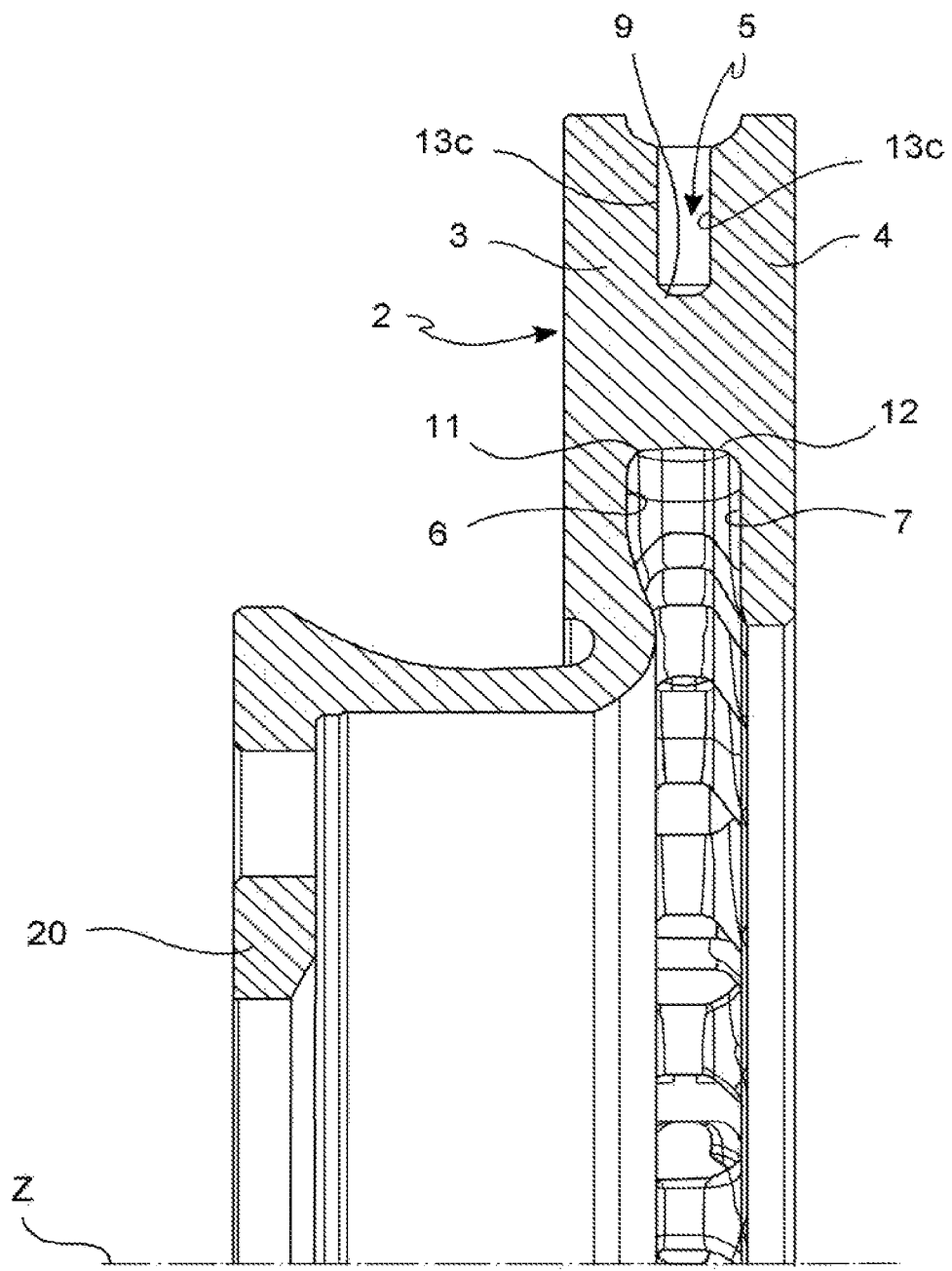
FIG. 3 is a partial sectional view of the brake disc according to the line III-III of FIG. 1.

In the embodiment illustrated in FIGS. 1-3, the elongate crests 13 are formed only by the connection elements 9 of the intermediate array 23. In other embodiments, not illustrated, the elongate crests 13 can be formed by connection elements 8 of the inner array 22.

According to a particularly advantageous embodiment, to each connection element 9 (or 8 or 10) three elongate crests 13a, 13b, 13c are associated, two 13a, 13b of which extend in two opposite ways in a circumferential or tangential direction, and a third more elongate crest 13c extends radially outwardly up to the vicinity of an outer peripheral edge C of the plate.

Figure 4:
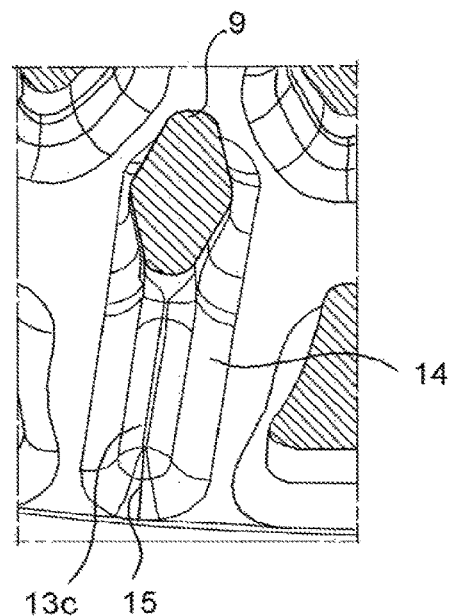
FIGS. 4, 5 and 6 are perspective views illustrating variant embodiments of the detail in FIG. 2.

According to a variant embodiment, illustrated in FIG. 4, only one elongate crest 13c can be associated to each connection element 9 (or 8 or 10), which extends in the radially outer direction.

Figure 5:
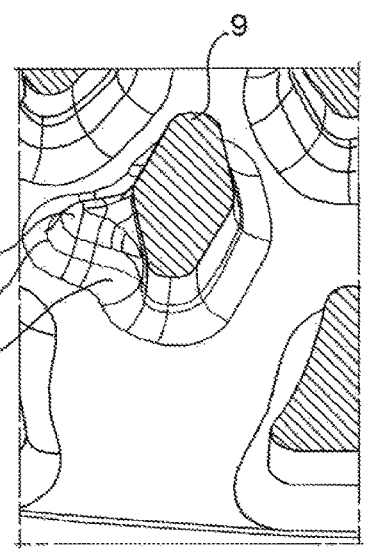

According to the variant embodiment illustrated in FIG. 5, only one longer crest 13a can be associated to each connection element 9 (or 8 or 10), which extends in a tangential or circumferential direction.

Figure 6:
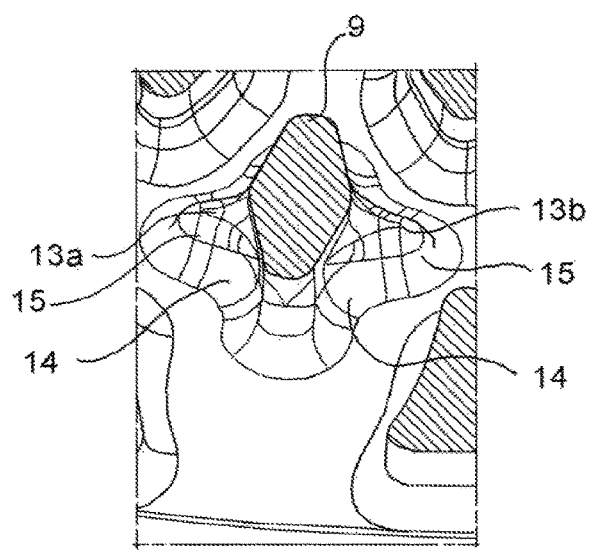

In accordance with the variant embodiment illustrated in FIG. 6, two elongated crests 13a, 13b can be associated to each connection element 9 (or 8 or 10), which extend in two opposite ways in a tangential or circumferential direction.

Preferably, each elongate crest 13 has a rounded free end 15 and has a convex profile, according to an axial cross-section plan.

Preferably, each elongate crest 13 is joined to the respective surface 6 or 7 of the plate by means of a concave radius 14.

As can be seen in FIG. 3, each elongate crest 13 is preferably opposite to and axially aligned with a corresponding elongate crest provided on the opposite facing surface, according to a substantially specular configuration relative to a geometric median plane passing through the gap 5 and perpendicular to the axis Z. In FIG. 3, said arrangement can be seen in relation with the elongate crests 13c; it should be understood that this specular geometry can also apply to the elongate crests 13a and/or 13b, when provided. In this embodiment, each elongate crest emerges from the respective surface 6 or 7, by a height less than half the distance between the surfaces 6 and 7.

In the embodiment in FIGS. 1 and 2, the connection elements 9 of the radially intermediate array 23 have a cross-section which is preferably shaped as a rhombus with rounded vertexes, slightly concave sides and main diagonal orientated in a radial direction.

In this embodiment, the third crest extends between two connection elements 10 of the outer array 21, whose section is preferably shaped as a triangle either flared or diverging in a radially outer direction.

In the exemplary embodiment in FIGS. 1 and 2, the connection elements 8 of the radially inner array 22 have a preferably drop-shaped cross section, which is elongated in the part thereof facing the radially external direction.

From a functional point of view, the elongate crests 13 define an overall increase, within the gap 5, of the heat transfer surface without resulting in a mass increase. At the same time, the elongate crests 13 increase the turbulence of the airflows passing through the ventilation ducts, thereby resulting in a greater removal of the brake disc heat by means of convection. An increase in the exchanged thermal power is thus obtained, whereby the operating temperatures are reduced and the operating life of the brake disc is extended.

Generally, the particular geometric shape of the axial section of the connection elements is not binding or crucial to achieve the advantageous results that this invention enables to achieve. Regardless of the geometrical shape of the section, however, the latter preferably has rounded vertexes and either a rastremated overall shape, or a such shape as to facilitate good access, distribution and flow of the air through the ventilation ducts.

In the embodiment illustrated in FIGS. 1 and 2, the column-like elements of the outer array 21, designated with 8, have a substantially diamond- or rhombus-shaped section, with rounded vertexes and the main diagonal orientated in substantially radial directions.

It is also preferred that the connection elements not provided with elongate crests 13 have concave radiuses 16 at their root or base portions, where the connection element is joined to one of the two plates.

The size of the connection elements 8, 9 and 10 can be changed based on the type of vehicle the disc is intended for.

Comparative tests carried out by the Applicant have demonstrated that:

with the same mass, material and conditions at the edge, the brake discs having the elongate crests of the above-discussed type ensure a better dissipation of heat (~10% increase in power removal);

compared to brake discs having traditional connection elements, a disc having the elongate crests of the type discussed above allows having advantages both in terms of mechanical stress (~10÷30% less) and dissipation of heat (~2% increase in power removal).

A comparative analysis has been carried out between two ventilated brake discs of the traditional type (indicated in the following table as disc I and disc II) and a brake disc according to the invention (indicated below as disc III) in order to appreciate the physical, mechanical and thermal performances of the disc obtained with the invention. The disc I was a "standard" ventilated brake disc with 31 circular-column connecting pins; the disc II was a 31-pin ventilated disc of the type illustrated in WO 2012/164465 A1. The disc III was a ventilated brake disc with 31 connecting pins, according to FIGS. 1-3.

Figures 7, 8:
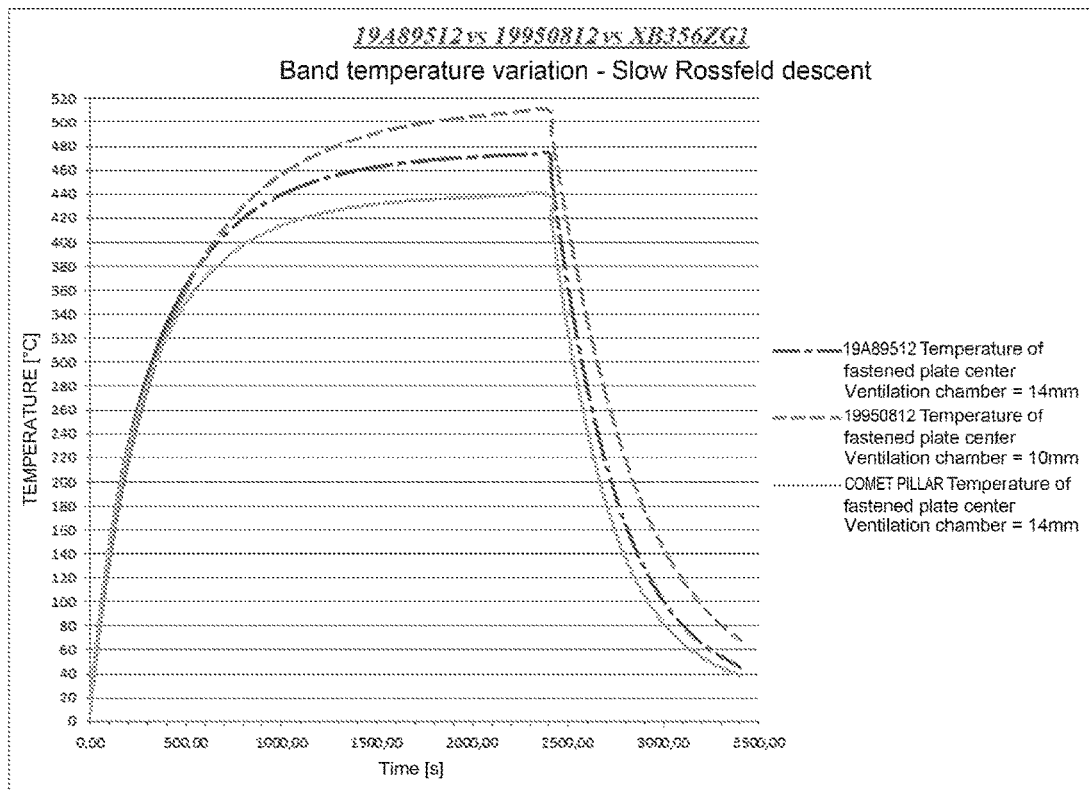
FIG. 7 is a table of values reported of removed thermal powerin in a disc.
FIG. 8 is a diagram of the temperature detected on disc III compared to standard disc I.

The values reported in FIG. 7 shows a significant +23.4% increase in the removed thermal power, in a disc according to the invention, compared to standard discs. It should be noted that the disc III had about 1 kg lower mass than the standard disc I.

FIG. 8 shows 71° C. decrease (i.e., 14%) in the operating temperature detected on disc III (440° C.) during the tests as compared to the standard disc I (511° C.). This significant temperature decrease will directly result in a sharp decrease in the formation of thermal cracks, without affecting the resistance and rigidity of the braking bands.

The ventilated brake disc according to the invention finally results to be easy and cost-effective to manufacture, because it can be made by means of fusion such as traditional discs. No use is made of components which are either external or made of a material other than the material of the brake disc, thereby optimizing the manufacture of the disc during the fusion process without requiring further subsequent operations.

Various aspects and embodiments of a brake disc according to the invention have been described. It should be understood that each embodiment can be combined with any other embodiment or made independently therefrom. Furthermore, the invention is not limited to the embodiments described herein, but may be varied within the scope of the claims attached herein.

The invention claimed is:

1. A brake disc of the ventilated type, comprising:
a braking band defined by two plates coaxial to an axis, the plates being mutually facing and spaced apart so as to form a gap, said plates having facing surfaces from which plate connection elements extend axially for connecting the plates, the facing surfaces delimiting, within the gap and together with the connection elements, ventilation ducts for cooling the disc; each connecting element having two ends at which the connecting element is joined to a respective one of the plates;
wherein
a plurality of said connecting elements are associated with elongate crests extending from said ends in at least one given direction,
the elongate crests comprise elongate crests extending in circumferential or tangential directions,
the elongate crests are formed integrally with the connecting elements and the plates,
the elongate crests are raised with respect to the facing surfaces of the two plates and each rise from one of the two facing surfaces to a height which is less than the axial distance between the two facing surfaces, and wherein
each elongate crest has a convex profile when viewed in an axial cross-sectional plane.

2. The brake disc of claim 1, wherein the elongate crests include elongate crests extending in radially outward directions up to the vicinity of an outer peripheral edge of the plate.

3. The brake disc of claim 1, wherein each of said plurality of connecting elements is associated with three elongate crests, two of which extend in two opposite ways in a circumferential direction, and a third elongate crest extends radially outwardly up to the vicinity of an outer peripheral edge of the plate.

4. The brake disc of claim 1, wherein each elongate crest has a rounded free end.

5. The brake disc of claim 1, wherein each elongate crest is joined to the respective facing surface of the plate by a concave radius.

6. The brake disc of claim 1, wherein the elongate crests are made by casting out of the same material of the plates and the connecting elements.

7. The brake disc of claim 1, wherein the connecting elements are arranged on three concentric circular arrays that include an outer array, an intermediate array and an inner array and wherein the elongate crests are formed only by the connecting elements of the intermediate array.

8. The brake disc of claim 1, wherein at least some of the elongate crests are opposed to and axially aligned with a corresponding projection provided by the opposite facing surface, according to a substantially specular arrangement with respect to a geometric median plane passing through the gap and perpendicular to the axis.

9. The brake disc of claim 1, wherein at least some of the elongate crests rise from a respective one of the facing surfaces to a height which is less than half the axial distance between the two facing surfaces.

10. A brake disc of the ventilated type, comprising:
a braking band defined by two plates coaxial to an axis, the plates being mutually facing and spaced apart so as to form a gap, said plates having facing surfaces from which plate connection elements extend axially for connecting the plates, the facing surfaces delimiting, within the gap and together with the connection elements, ventilation ducts for cooling the disc; each connecting element having two ends at which the connecting element is joined to a respective one of the plates;
wherein
a plurality of said connecting elements are associated with elongate crests extending from said ends in at least one given direction,
the elongate crests comprise elongate crests extending in circumferential or tangential directions,
the elongate crests are formed integrally with the connecting elements and the plates,
the elongate crests are raised with respect to the facing surfaces of the two plates and each rise from one of the two facing surfaces to a height which is less than the axial distance between the two facing surfaces, and wherein
the connecting elements are arranged on three concentric circular arrays that include an outer array, an intermediate array and an inner array and wherein the elongate crests are formed only by the connecting elements of the intermediate array.

11. The brake disc of claim 10, wherein the elongate crests include elongate crests extending in radially outward directions up to the vicinity of an outer peripheral edge of the plate.

12. The brake disc of claim 10, wherein each of said plurality of connecting elements is associated with three elongate crests, two of which extend in two opposite ways in a circumferential direction, and a third elongate crest extends radially outwardly up to the vicinity of an outer peripheral edge of the plate.

13. The brake disc of claim 10, wherein each elongate crest has a rounded free end.

14. The brake disc of claim 10, wherein each elongate crest is joined to the respective facing surface of the plate by a concave radius.

15. The brake disc of claim 10, wherein the elongate crests are made by casting out of the same material of the plates and the connecting elements.

16. The brake disc of claim 10, wherein at least some of the elongate crests are opposed to and axially aligned with a corresponding projection provided by the opposite facing surface, according to a substantially specular arrangement with respect to a geometric median plane passing through the gap and perpendicular to the axis.

17. The brake disc of claim 10, wherein at least some of the elongate crests rise from a respective one of the facing surfaces to a height which is less than half the axial distance between the two facing surfaces.

\* \* \* \* \*